W. N. RUMELY & W. C. ROBBY.
INTERCHANGEABLE GRAIN THRESHER AND HULLER.
APPLICATION FILED AUG. 17, 1914.
1,177,812.
Patented Apr. 4, 1916.
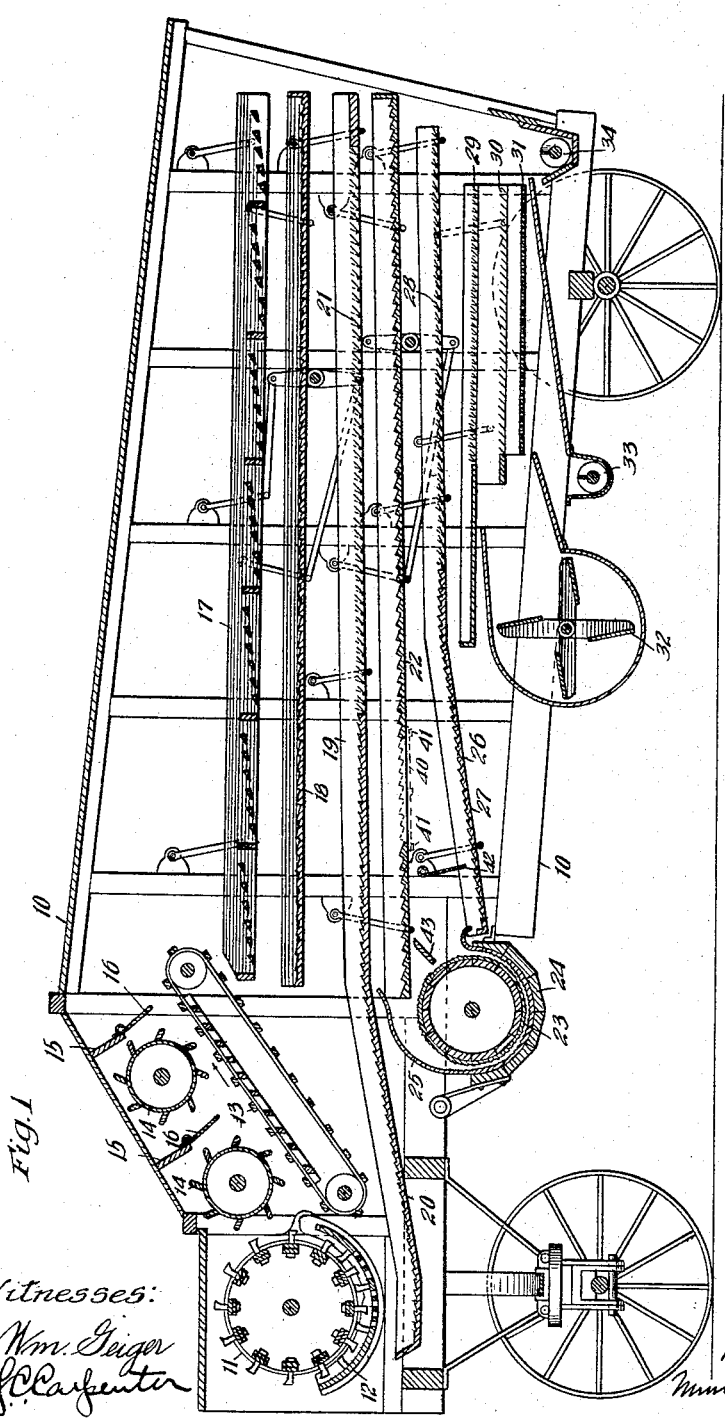
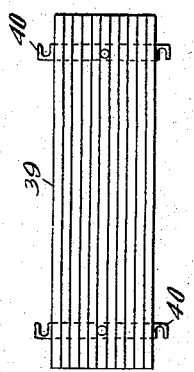
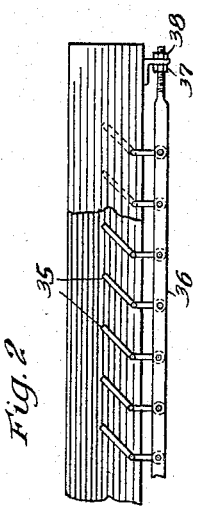

UNITED STATES PATENT OFFICE.

WILLIAM N. RUMELY AND WILLIAM C. ROBBY, OF SYCAMORE, ILLINOIS, ASSIGNORS TO ILLINOIS THRESHER COMPANY, OF SYCAMORE, ILLINOIS, A CORPORATION OF ILLINOIS.

INTERCHANGEABLE GRAIN THRESHER AND HULLER.

1,177,812. Specification of Letters Patent. Patented Apr. 4, 1916.

Original application filed November 20, 1913, Serial No. 802,020. Divided and this application filed August 17, 1914. Serial No. 857,090.

*To all whom it may concern:*

Be it known that we, WILLIAM N. RUMELY and WILLIAM C. ROBBY, citizens of the United States, residing at Sycamore, in the county of Dekalb and State of Illinois, have invented a new and useful Improvement in Interchangeable Grain Threshers and Hullers, of which the following is a specification.

This invention relates to improvements in interchangeable grain threshers and hullers, and the same is a division of our earlier application Serial No. 802020, filed Nov. 20, 1913.

One object of the invention is to provide a grain thresher or separator which may be readily changed and adapted for hulling clover, alfalfa and the like.

Another object of the invention is to provide a thresher or separator of large capacity and so arranged that all the chaff and grain therewith which falls from the straw rack shall be returned to the forward end of the chaffer and compelled to traverse the entire length thereof to thereby insure the entire separation of the grain.

Another object of the invention is to so arrange the return floors that the chaff and grain mingled therewith shall be thoroughly separated and loosened each time before it is acted upon by the chaffers.

Another object of the invention is to provide a removable section in the return floor which is used to conduct clover and alfalfa to the hulling mechanism, said removable section being so located that when taken out, the material is not fed to the hulling mechanism.

The invention furthermore consists in the improvements in the parts and devices and in the novel combinations of the parts and devices as herein shown, described or claimed.

In the drawing forming a part of this specification, Figure 1 is a longitudinal sectional view of one form of apparatus embodying our improvements. Fig. 2 is an enlarged detail view showing the arrangement of adjustable chaffer and Fig. 3 is a detail view showing the removable floor section.

In said drawing the frame of the machine is designated generally by the reference 10 and mounted thereon at the forward end is a cylinder 11, concave 12 and elevating rake 13, all of which may be of any well known construction familiar to those skilled in the art. Above the elevating rake 13 are placed two rotatable wing beaters 14, 14, separated by partition 15 having a fall board 16 pivoted thereto. A similar partition and fall board is placed above the uppermost beater 14.

The elevating rake 13 throws the straw, chaff and intermingled grain onto a reciprocating straw rack 17 which extends substantially to the rear end of the machine. Beneath the straw rack 17 and substantially coextensive therewith is a return floor 18 which is adapted to return the chaff and grain intermingled therewith which falls through the straw rack, to the forward end of the machine and to throw it down onto the chaffer 19, the latter having a downwardly inclined floor portion 20 which extends forwardly beneath the concave 12 and the elevating rake 13 and between the threshing cylinder and hulling mechanism hereinafter described. To the rear of the floor portion 20, and beneath the return floor 18, the chaffer 19 is provided with an adjustable chaffer-section 21, described more in detail hereinafter.

Beneath the chaffer 19 is a second return floor 22, the forward end of which is located directly above the rasp cylinder 23 coöperable with a huller concave 24 which together constitute the hulling mechanism. Beneath the return floor 22 is another chaffer 26 having a solid floor portion 27 extending to the hulling mechanism and adapted to receive the material therefrom, said chaffer having an adjustable chaffer portion 28 similar to the portion 21 of the chaffer 19. Below the chaffer 26 is a third adjustable chaffer 29 and beneath the latter is a cleaning shoe 30 and sieve 31. A fan 32 of usual construction is employed and the grain is collected by the main auger 33 and the tailings are carried by the tailings auger 34.

Each adjustable chaffer preferably comprises a plurality of pivoted slats 35 all pivotally connected to an adjusting rod 36 held in position by bolt and nuts 37, 38, as shown most clearly in Fig. 2.

As shown in dotted lines in Fig. 1 and also in Fig. 3, the return floor 22 is provided with a removable floor section 39 held in place by any suitable means such as a pivoted cross bar 40 and brackets 41 secured to the underside of the main portion of the return floor. Just forward of the opening in the return floor 22 that receives the removable floor section 39, and below the return floor, is a pivoted fall board 42, the function of which is to prevent the grain and chaff which falls through the opening in the floor 22, when the machine is being used for threshing grain, from getting into the hulling mechanism. When the machine is being used for hulling purposes this board will be moved or removed to avoid interfering with the material coming from the hulling mechanism. A fixed deflector plate 43 is also provided to insure the clover and alfalfa being deposited on the chaffer 26 as they come from the hulling mechanism.

When the machine is being used for separating grain, the floor section 39 will be taken out and the grain as it comes from the chaffer 19 will be thrown forward by the return floor 22 and dropped through the opening therein onto the chaffer 26, whereupon it will be thrown to the rear of the machine and separated by the chaffer and screens in the usual manner.

When the machine is to be used for hulling clover and alfalfa, the floor section 39 will be secured in place, and the rasp cylinder 23 connected by suitable driving mechanism with the source of power (not shown) so that the clover and alfalfa, as they fall through the chaffer 19 onto the return floor 22 will be fed by the latter to the hulling mechanism where the clover and alfalfa will be hulled and thrown onto the chaffer 26 and the material separated in the usual manner. The openings in the various chaffers will be adjusted to accommodate the different materials being treated.

From the foregoing description, it will be seen that we have provided a single apparatus which may be interchanged and adapted for use either as a grain separator or as a huller, the change of parts and adjustments thereof being so few and simple that the same may be made, in actual practice, in a very few minutes.

By making the return floor 18 of the same length as the straw rack 17 or of such length as to return all the material which falls through the straw rack, to the chaffer 19 at a point in front of the openings therein, we insure a complete separating and loosening of the materials before being acted upon by the chaffer, and in this way the capacity of the apparatus is materially increased. The return floor 22 is also constructed so that all the materials are dropped on the chaffer 26 at a point in front of the open portion thereof. By inclining the forward end of the chaffer 19 where it passes between the threshing and hulling mechanism, we are enabled to keep the threshing cylinder low enough down to be easily accessible to the operator.

Although we have herein shown and described what we now consider the preferred embodiments of our improvements, yet it will be understood that various changes and modifications may be made in the parts and arrangements thereof without departing from the spirit of the invention, and all such changes and modifications are contemplated as come within the scope of the claims appended hereto.

We claim:

1. In a convertible thresher and huller, the combination with a cylinder, associated concave and straw rack, of a return floor below and substantially co-extensive with said rack, a chaffer below said return floor extending from a point below the cylinder to the rear end of the return floor, a return floor beneath said chaffer, hulling mechanism to which said last named return floor is adapted to feed material, a chaffer beneath said last named return floor and adapted to receive the material from the hulling mechanism, said last mentioned return floor being adapted to transfer material being treated directly to the last named chaffer instead of being fed to the hulling mechanism, substantially as specified.

2. In a convertible thresher and huller, the combination with a cylinder, associated concave and straw rack, of a return floor below and substantially co-extensive with said rack, a chaffer below said return floor extending from a point below the cylinder to the rear end of the return floor, a return floor beneath said chaffer, hulling mechanism to which said last named return floor is adapted to feed material, a chaffer beneath said last named return floor and adapted to receive the material from the hulling mechanism, said last mentioned return floor including a removable floor section to permit the material being treated to be transferred therefrom to the last named chaffer instead of to the hulling mechanism.

3. A convertible thresher and huller having a rack, return floor, chaffer below the return floor, hulling mechanism below the chaffer, a sieve, a device for ejecting separated grain and hulled clover, alfalfa and the like out of said thresher and huller, and a member for directing unhulled clover and alfalfa to said huller and for directing separated grain to said ejecting device and past said huller; substantially as specified.

4. A convertible thresher and huller having a straw rack, chaffer, return floor beneath said chaffer, hulling mechanism, a chaffer below said return floor, said return floor being adapted to convey the material to the hulling mechanism and the last named chaffer being adapted to receive the material therefrom, and a removable floor section in said return floor adapting the material to be dropped from the return floor to the last named chaffer when said section is removed, substantially as specified.

5. A convertible thresher and huller having, in combination: a threshing cylinder, hulling mechanism located below and to the rear of the threshing cylinder, and a chaffer having its forward end inclined downwardly and passing between the hulling mechanism and the threshing cylinder and beneath the latter to thereby permit of the threshing cylinder being placed in a low position, substantially as specified.

6. A machine of the character described including in combination: hulling mechanism, a return floor having a removable section therein and adapted to convey the materials to said hulling mechanism, and a movable partition located below said return floor and forward of the removable section therein, said partition being adapted to prevent the materials which fall through the return floor when said section is removed, from getting into the hulling mechanism, substantially as specified.

Signed this 12th day of Aug., 1914, in the presence of two witnesses.

WILLIAM N. RUMELY.
WILLIAM C. ROBBY.

Witnesses:
P. B. McINTYRE,
I. M. MITCHELL.

Copies of this patent may be obtained for five cents each, by addressing the "Commissioner of Patents, Washington, D. C."